(12) United States Patent
Cheng et al.

(10) Patent No.: US 11,573,314 B2
(45) Date of Patent: Feb. 7, 2023

(54) ULTRA-WIDEBAND (UWB) TAG AND OPERATION METHODS THEREOF

(71) Applicant: Sernet (Suzhou) Technologies Corporation, Suzhou (CN)

(72) Inventors: Lin Cheng, Suzhou (CN); Cheng-Chao Wang, Suzhou (CN)

(73) Assignee: SERNET (SUZHOU) TECHNOLOGIES CORPORATION, Suzhou (CN)

( * ) Notice: Subject to any disclaimer, the term of this patent is extended or adjusted under 35 U.S.C. 154(b) by 0 days.

(21) Appl. No.: 17/898,959

(22) Filed: Aug. 30, 2022

(65) Prior Publication Data

US 2022/0413123 A1    Dec. 29, 2022

Related U.S. Application Data

(62) Division of application No. 17/068,038, filed on Oct. 12, 2020, now Pat. No. 11,486,998.

(30) Foreign Application Priority Data

Dec. 12, 2019 (CN) .......................... 201911276772.7

(51) Int. Cl.
| | | |
|---|---|---|
| *G01S 13/76* | (2006.01) | |
| *H04W 4/029* | (2018.01) | |
| *H04B 1/7163* | (2011.01) | |

(52) U.S. Cl.
CPC .......... *G01S 13/767* (2013.01); *H04B 1/7163* (2013.01); *H04W 4/029* (2018.02)

(58) Field of Classification Search
CPC ..... G01S 13/767; H04W 4/029; H04B 1/7163
USPC ....................................................... 455/456.1
See application file for complete search history.

(56) References Cited

U.S. PATENT DOCUMENTS

2018/0220345 A1\*   8/2018   Moon .................... H04B 7/088

\* cited by examiner

*Primary Examiner* — Ted M Wang
(74) *Attorney, Agent, or Firm* — WPAT, PC (57) ABSTRACT

The invention discloses an ultra-wideband (UWB) positioning system, UWB base stations (BSs), UWB tags and the operation methods thereof. Because the present invention uses a server aware of the positions of all BSs to determine the BSs that performs distance measurement, and the server assigns different time slots to each BS that performs distance measurement, the present invention can avoid collisions between the BSs in the process of distance measurement. Furthermore, because the tag can select a specific time slot to access the UWB positioning system by monitoring the UWB signals in the air, the present invention can reduce collisions between the tags. By carefully planning the system frames and subframes of the time division multiplexing system, and sophisticatedly arranging the operation timings of the BSs and the tags, the present invention provides practical and stable UWB positioning system, BSs, and tags.

14 Claims, 10 Drawing Sheets

ULTRA-WIDEBAND (UWB) TAG AND OPERATION METHODS THEREOF

CROSS REFERENCE

The present application is a divisional application of U.S. patent application Ser. No. 17/068,038, which was filed Oct. 12, 2020, the disclosure of which is hereby incorporated by reference in its entirety.

BACKGROUND OF THE INVENTION

1. Field of the Invention

The present invention generally relates to an ultra-wideband (UWB) positioning system.

2. Description of Related Art

The UWB positioning system uses multiple base stations (BSs), which are also referred to as nodes or anchors, to measure the distances of multiple tags, and accordingly calculates the positions of the tags in the three-dimensional space. It is important to coordinate the communication scheduling between the BSs and the tags because a good coordination can avoid collisions and make the positioning system more stable. In addition, choosing a combination of suitable positioning BSs for each tag can provide better parameters for subsequent positioning algorithms.

SUMMARY OF THE INVENTION

In view of the issues of the prior art, an object of the present invention is to provide an ultra-wideband (UWB) positioning system, base stations (BSs), tags and operation methods thereof to avoid collisions and improve the stability of the system.

An operation method applied to an UWB positioning tag is provided. The UWB positioning tag has a tag identification number. The operation method includes the following steps: broadcasting a beacon signal; receiving a polling signal sent by a BS; parsing the polling signal which contains a target tag identification number; determining whether the tag identification number is the same as the target tag identification number; and sending a distance measurement reply signal to the BS after confirming that the tag identification number is the same as the target tag identification number. The distance measurement reply signal contains a first time point when the polling signal is received and a second time point when the distance measurement reply signal is sent.

An operation method applied to an UWB positioning BS is provided. The UWB positioning BS is applied to an UWB positioning system. The UWB positioning system includes a server. Each system period of the UWB positioning system includes a plurality of system frames, and each system frame includes a plurality of subframes. The operation method includes the following steps: receiving a beacon signal sent by a tag, the beacon signal containing a tag identification number of the tag; calculating a signal strength of the beacon signal; sending the beacon signal and the signal strength to the server; receiving a distance measurement command sent by the server, the distance measurement command specifying a subframe number; sending a polling signal in a subframe corresponding to the subframe number and receiving, in the subframe, a distance measurement reply signal sent by the tag, the polling signal containing the tag identification number, and the distance measurement reply signal containing time information; and sending the time information to the server.

An operation method of an UWB positioning system is provided. The UWB positioning system includes a server, a BS and a tag. Each system period of the UWB positioning system includes a plurality of system frames, and each system frame includes a plurality of subframes. The operation method includes the following steps: broadcasting by the tag a beacon signal, the beacon signal containing a tag identification number of the tag; calculating by the BS a signal strength of the beacon signal; sending by the BS the beacon signal and the signal strength to the server; sending by the server a distance measurement command to the BS, the distance measurement command specifying a subframe number; sending by the BS a polling signal to the tag in a subframe corresponding to the subframe number, the polling signal containing the tag identification number; sending by the tag a distance measurement reply signal to the BS in the subframe corresponding to the subframe number, the distance measurement reply signal containing time information; and sending by the BS the time information to the server.

An ultra-wideband (UWB) positioning tag which has a tag identification number is provided. The UWB positioning tag includes a wireless transceiver circuit, a memory for storing a plurality of program codes or program instructions, and a computing circuit configured to execute the program codes or program instructions to perform the following steps: broadcasting a beacon signal; receiving a polling signal sent by a base station (BS); parsing the polling signal which contains a target tag identification number; determining whether the tag identification number is the same as the target tag identification number; and sending a distance measurement reply signal to the BS after confirming that the tag identification number is the same as the target tag identification number, wherein the distance measurement reply signal contains a first time point when the polling signal is received and a second time point when the distance measurement reply signal is sent.

According to the present invention, the UWB positioning system, BSs, tags and operation methods thereof use a server aware of the positions of all BSs to select the BSs for measuring the distances, rather than randomly selecting the BSs based on the tag. Compared with the conventional technology, because the server of the present invention assigns different time slots to each BS that performs distance measurement, the collision of distance measurement between the BSs can be avoided.

These and other objectives of the present invention no doubt become obvious to those of ordinary skill in the art after reading the following detailed description of the preferred embodiments with reference to the various figures and drawings.

DETAILED DESCRIPTION OF THE EMBODIMENTS

On account of that some or all elements of the ultra-wideband (UWB) positioning system, base stations (BSs) and tags could be known, the detail of such elements is omitted provided that such detail has little to do with the features of this disclosure, and that this omission nowhere dissatisfies the specification and enablement requirements. Some or all of the processes of the operation methods may be implemented by software and/or firmware and can be performed by the UWB positioning system, BSs and tags or their equivalents; therefore, the discussions of the method inventions focus on the steps rather than the hardware. A person having ordinary skill in the art can choose components or steps equivalent to those described in this specification to carry out the present invention, which means that the scope of this invention is not limited to the embodiments in the specification.

Figure 1:
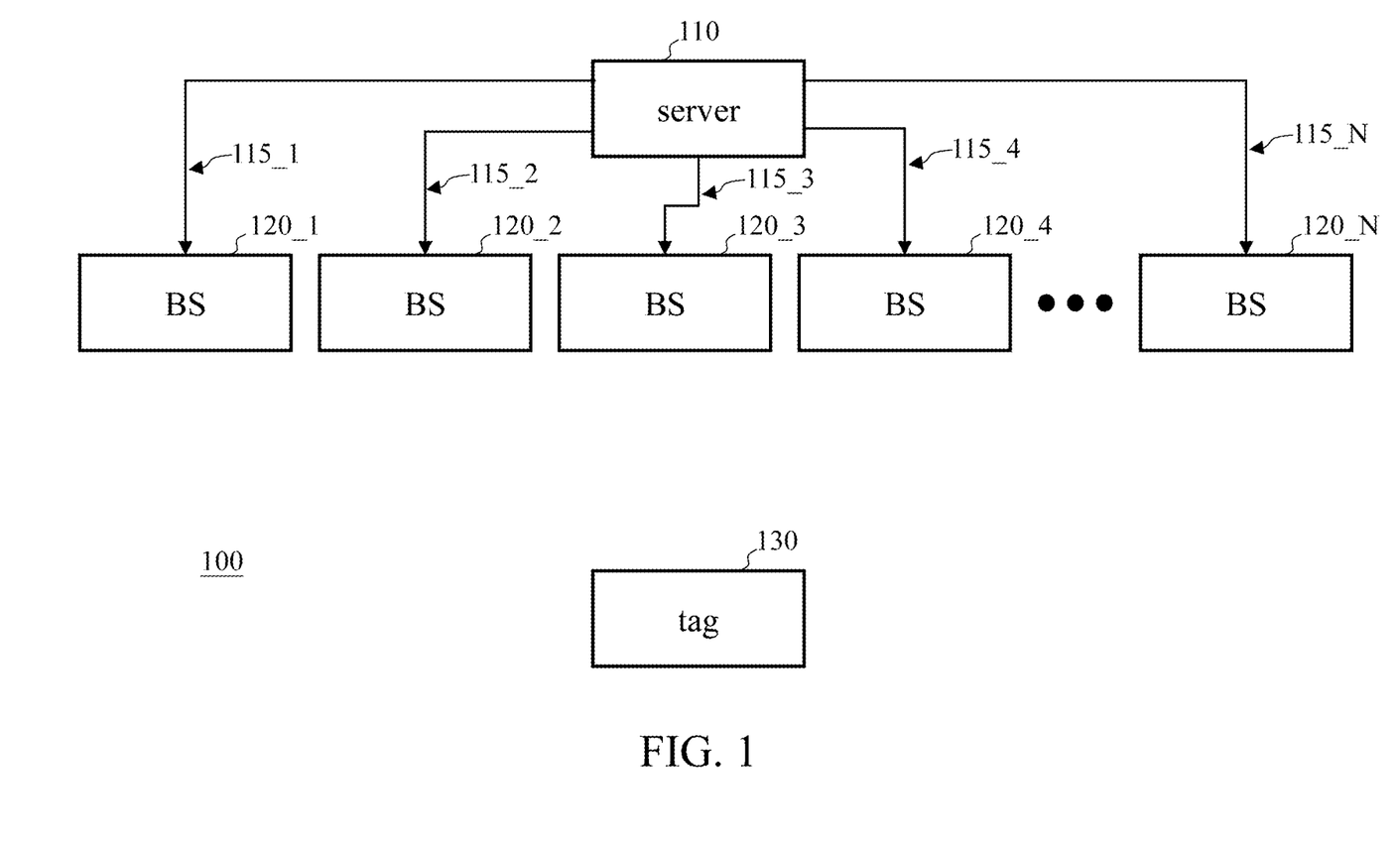
FIG. 1 is an illustrative connection topology of an ultra-wideband (UWB) positioning system according to an embodiment of the present invention.

FIG. 1 is a connection topology of an ultra-wideband (UWB) positioning system according to an embodiment of the present invention. The UWB positioning system 100 includes a server 110, N base stations (BSs) 120 (which include 120_1, 120_2, 120_3, 120_4, . . . and 120_N, N being an integer greater than or equal to four for three-dimensional positioning, three for two-dimensional positioning, and two for one-dimensional positioning) and at least a tag 130. The server 110 can be directly/indirectly connected to each BS 120 through, for example, wired/wireless signal connections 115 (including 115_1, 115_2, 115_3, 115_4, . . . and 115_N) or through a daisy chain or other topologies. The BSs 120 and the tag 130 communicate with each other through UWB signals. Time synchronization can be ensured among the BSs 120 based on distributed clock pulse synchronization (e.g., the IEEE1588v2 specification). Each BS 120 has a unique BS identification number, and each tag 130 has a unique tag identification number.

Figure 2:
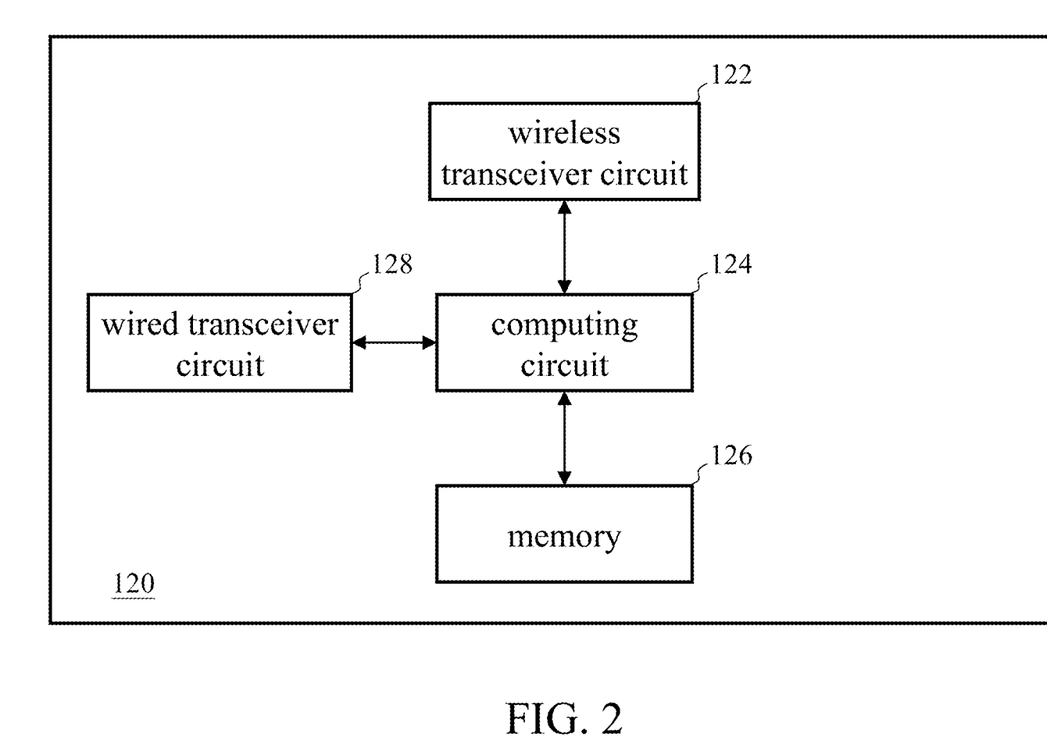
FIG. 2 is an illustrative functional block diagram of an UWB positioning base station (BS) according to an embodiment of the present invention.

FIG. 2 is a functional block diagram of an UWB positioning BS according to an embodiment of the present invention. Each BS 120 includes a wireless transceiver circuit 122, a computing circuit 124 and a memory 126. The wired transceiver circuit 128 is optional and may be omitted in the embodiments where the signal connections 115 are wireless. The memory 126 can store multiple program codes or program instructions. The computing circuit 124 realizes the functions of the BS 120 by executing the program codes or program instructions.

Figure 3:
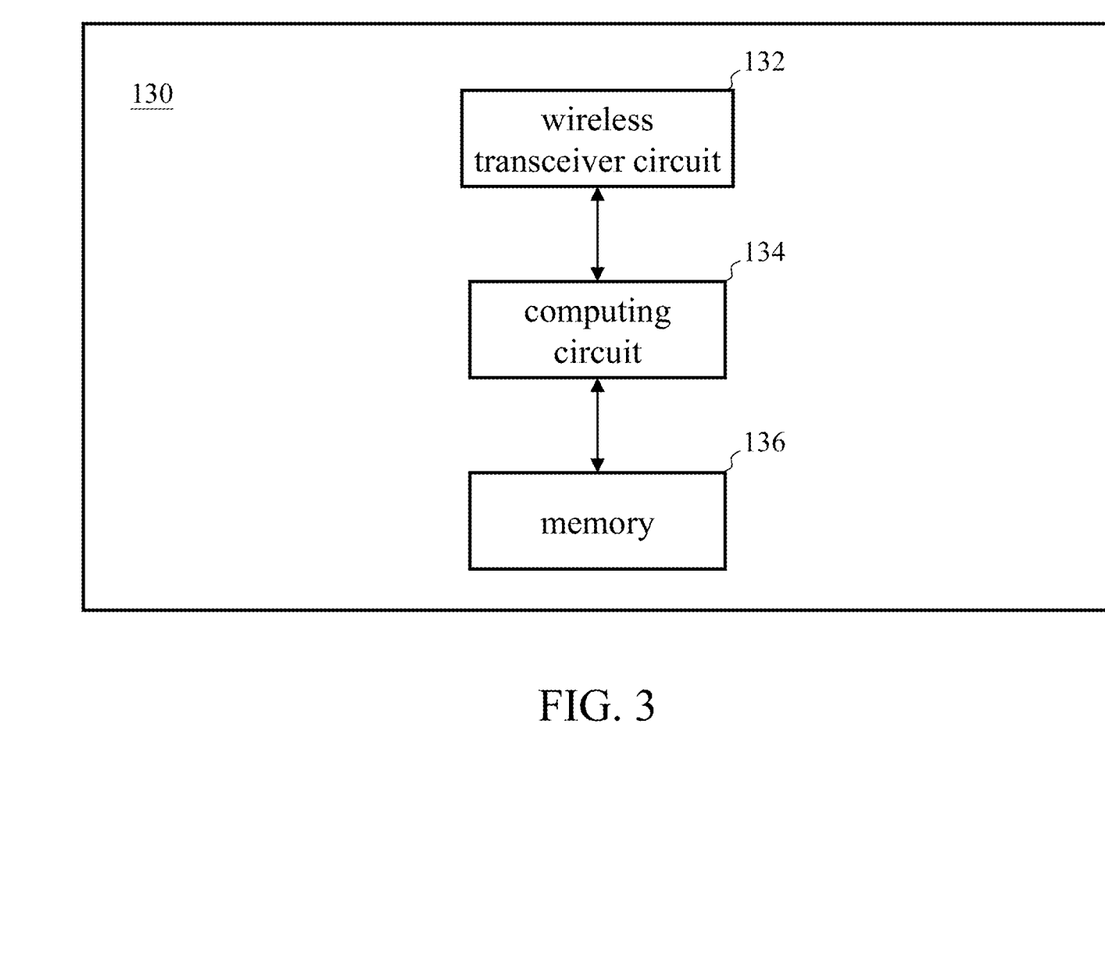
FIG. 3 is an illustrative functional block diagram of an UWB positioning tag according to an embodiment of the present invention.

FIG. 3 is a functional block diagram of an UWB positioning tag according to an embodiment of the present invention. Each tag 130 includes a wireless transceiver circuit 132, a computing circuit 134 and a memory 136. The memory 136 may store multiple program codes or program instructions. The computing circuit 134 realizes the functions of the tag 130 by executing the program codes or program instructions.

Figure 4:
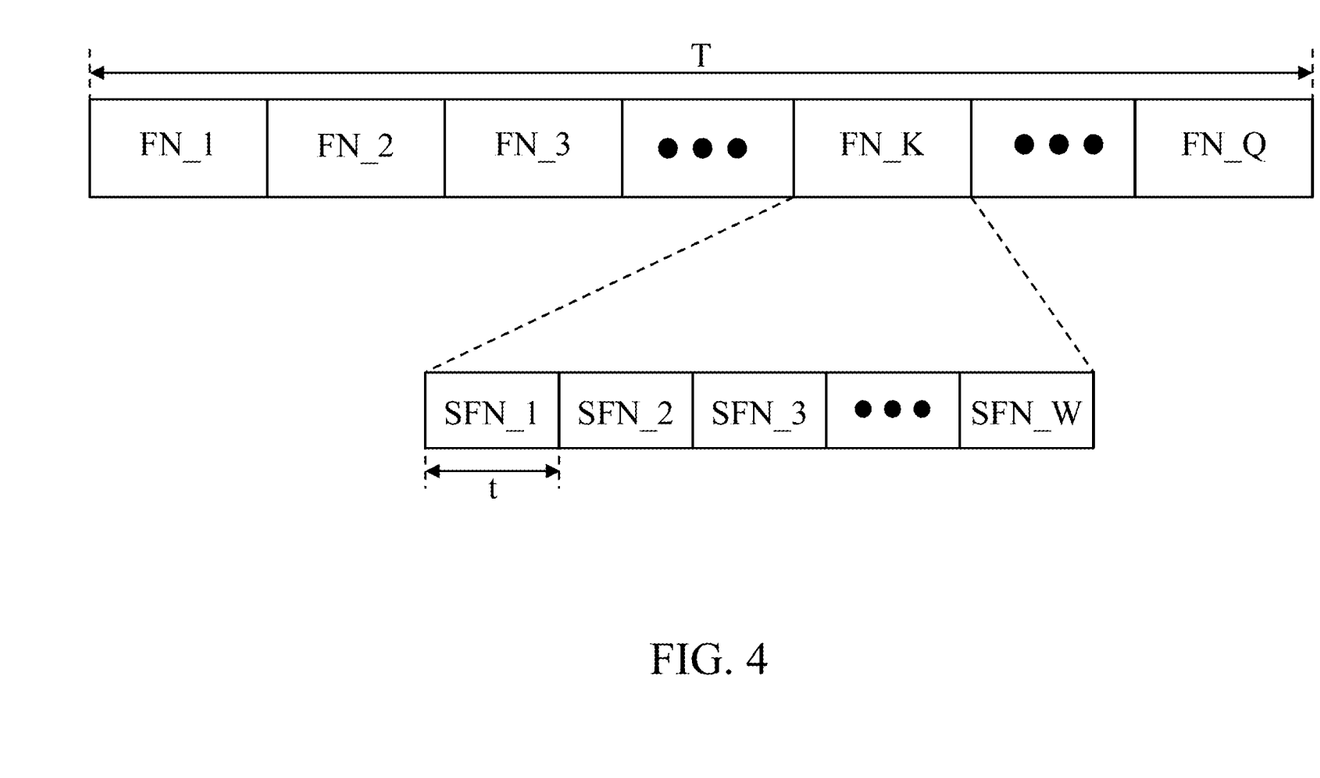
FIG. 4 is an illustrative arrangement of the system frames and subframes of the UWB positioning system according to the present invention.

FIG. 4 is an arrangement of the system frames and subframes of the UWB positioning system according to the present invention. The operating period of the system 100 is T second(s) (i.e., the server 110 refreshes the position of the tag 130 every T second(s), namely, the refresh frequency of the system is 1/T Hz). One period is evenly divided into Q system frames (the system frame numbers are FN_1, FN_2, FN_3, . . . , FN_K, . . . and FN_Q, respectively, $1 \leq K \leq Q$), and each system frame contains W subframes (the subframes numbers are SFN_1, SFN_2, SFN_3, . . . and SFN_W, respectively). If the length of each subframe is t second(s), then the length of a system frame is t*W second(s), and the system period T is t*W*Q second(s).

Basically, the BSs 120 assign a time length of one system frame for each tag to be positioned, so the system 100 can allow Q tags to connect or access at the same time. It is assumed in the following discussion that the BSs 120 assign the system frame FN_K to the tag 130, and therefore, the BSs 120 keep the following information in the memory 126: the system frame FN_K and the tag identification number of the tag 130 corresponding to each other, and the system frame FN_K being in a busy/non-idle state. The tag 130 broadcasts a BCN signal (beacon signal) containing the tag identification number of the tag 130 to the BSs 120 in the first subframe of the system frame FN_K (i.e., subframe SFN_1, which may also be referred to as a beacon subframe), and receives the POL signals (polling signals, which are sent by W-1 BSs 120) in the subframes of the system frame FN_L other than the subframe SFN_1 (i.e., the subframes SFN_2 to SFN_W, which may also be referred to as positioning subframes), respectively. If K+x is not greater than Q, then L=K+x; if K+x is greater than Q, then L=(K+x) mod Q, where x is the transmission buffer and/or computation buffer, which can be determined and configured in advance. In some embodiments, if the server 110 and the BSs 120 have excellent computing power and the transmission buffer between the server 110 and the BSs 120 is extremely small, then x=0, in which case the tag 130 broadcasts the BCN signals and receives multiple POL signals in the same system frame (i.e., FN_K).

Figure 5:
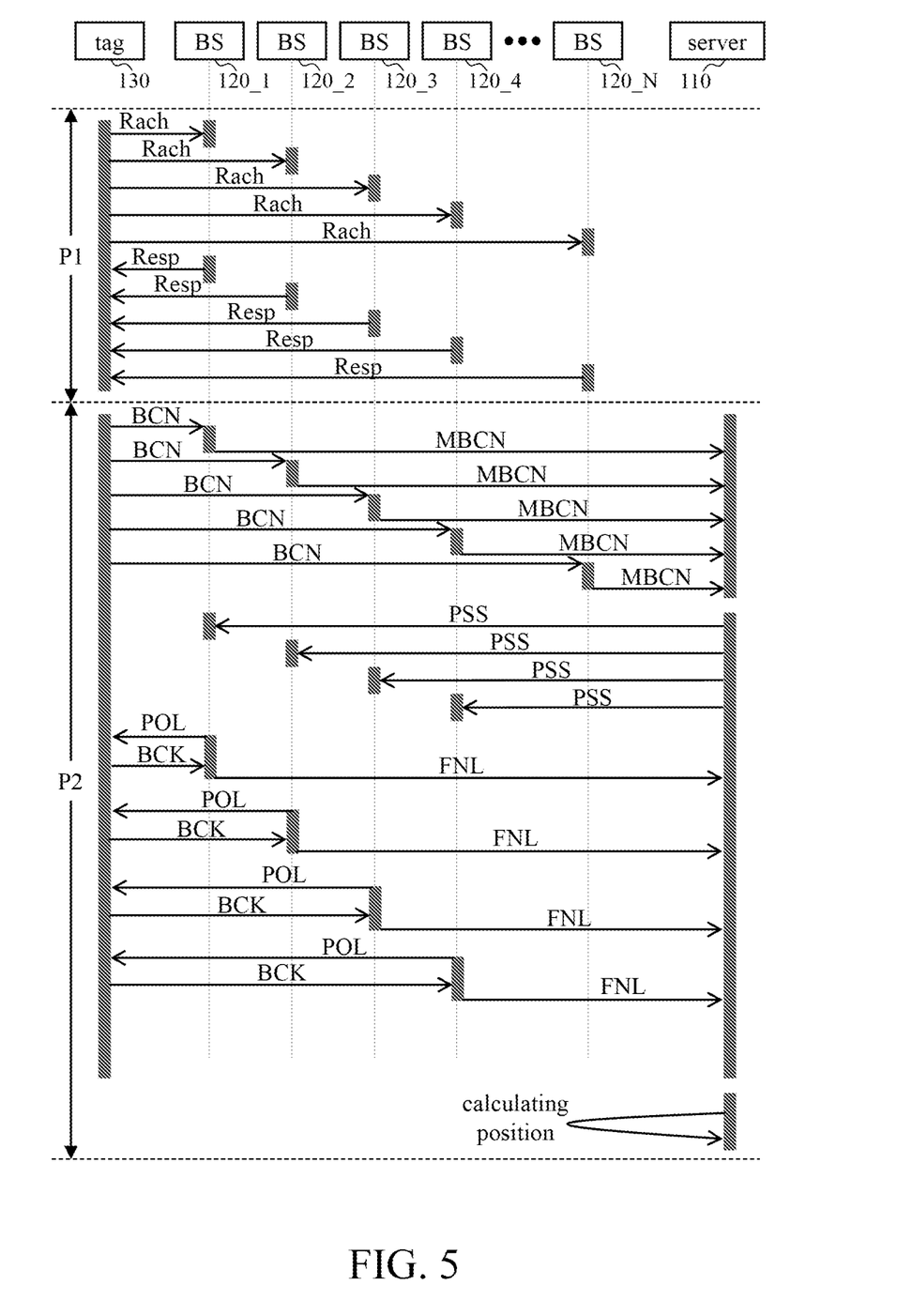
FIG. 5 is an illustrative sequence diagram of an UWB positioning system according to an embodiment of the present invention.

FIG. 5 is a sequence diagram of an UWB positioning system according to an embodiment of the present invention. The sequence diagram includes two main operations: the tag 130 accessing the system 100 (denoted by stage P1 in the figure), and the system 100 performing distance measurement and positioning on the tag 130 (denoted by stage P2 in the figure). The present invention can use the time of flight (TOF) to measure the distance, but the present invention is not limited to this approach.

In the operation of the tag 130 accessing the positioning system, the tag 130 randomly broadcasts (i.e., broadcasts in any system frame) the Rach signal (access request signal) to try to access the system 100, and each of the BSs 120 that receive the Rach signal will send the Resp signal (access reply signal) that carries time information to the tag 130. More specifically, if the BS 120_1 and the BS 120_2 receive the Rach signal in the system frame R (1≤R≤Q), the BS 120_1 and the BS 120_2 select an idle system frame after the system frame R and then send the Resp signal in one of the positioning subframes (SFN_2 to SFN_W) of the idle system frame. In other words, the BS 120_1 and the BS 120_2 may send their respective Resp signals in the same positioning subframe of the same system frame, and the tag 130 may receive at least one Resp signal. The Rach signal carries the tag identification number of the tag 130, and the Resp signal carries both the time information and the tag identification number. The time information is, for example, the system frame number and subframe number at the time when the BS 120 sends the Resp signal. Thus, the tag 130 can know the current system time from the time information, and accordingly starts time synchronization with all BSs 120 and determines when to broadcast the BCN signal and when to receive the POL signals. After time synchronization with the BSs 120, the tag 130 completes the access to the positioning system and can then start the positioning procedure.

In the operation of positioning the tag 130, every system period T, the tag 130 broadcasts one BCN signal in the subframe SFN_1 of the system frame FN_K. The BSs that receive the BCN signal send the corresponding MBCN signals to the server 110. The MBCN signal contains the content of the BCN signal, the BS's identification number, and signal strength information (e.g., the Received Signal Strength Indication (RSSI) information) about the BCN signal. Based on the received MBCN signals, the server 110 selects multiple BSs (preferably four BSs, such as the BSs 120_1, 120_2, 120_3 and 120_4 in the example of FIG. 5) suitable for distance measurement and issues a distance measurement command PSS to these selected BSs. The server 110 knows the positions of the BSs 120, so the server 110 can avoid selecting the BSs 120 arranged in a straight line for positioning. The server 110 assigns different subframes to the selected BSs 120 (i.e., BSs 120_1, 120_2, 120_3 and 120_4) through the distance measurement commands PSS, and the selected BSs 120 accordingly send the POL signals in order in their respective assigned subframes of the system frame FN_L. The tag 130 receives the POL signals in order in the consecutive subframes of the system frame FN_L and immediately sends a BCK signal (distance measurement reply signal) to the corresponding BS 120, and then the BS 120 sends the distance measurement result FNL to the server 110 based on the BCK signal. The distance measurement result FNL includes the time when the BS 120 sends the POL signal, the time when the tag 130 receives the POL signal, the time when the tag 130 sends the BCK signal, and the time when the BS 120 receives the BCK signal. Finally, the server 110 calculates the position of the tag 130 based on the pieces of signal time information carried in the received distance measurement result FNL. For example, if the server 110 assigns the subframe SFN_2 to the BS 120_2, then in the subframe SFN_2 of the system frame FN_L, the BS 120_2 sends the POL signal, the tag 130 receives the POL signal and sends the BCK signal, and the BS 120_2 receives the BCK signal. The POL signal includes the following pieces of information: (1) the identification number of the BS 120 which sends the POL signal, (2) the tag identification number of the tag to which the POL signal is to be sent, and (3) the time information (e.g. the current system frame number and subframe number).

Figure 6:
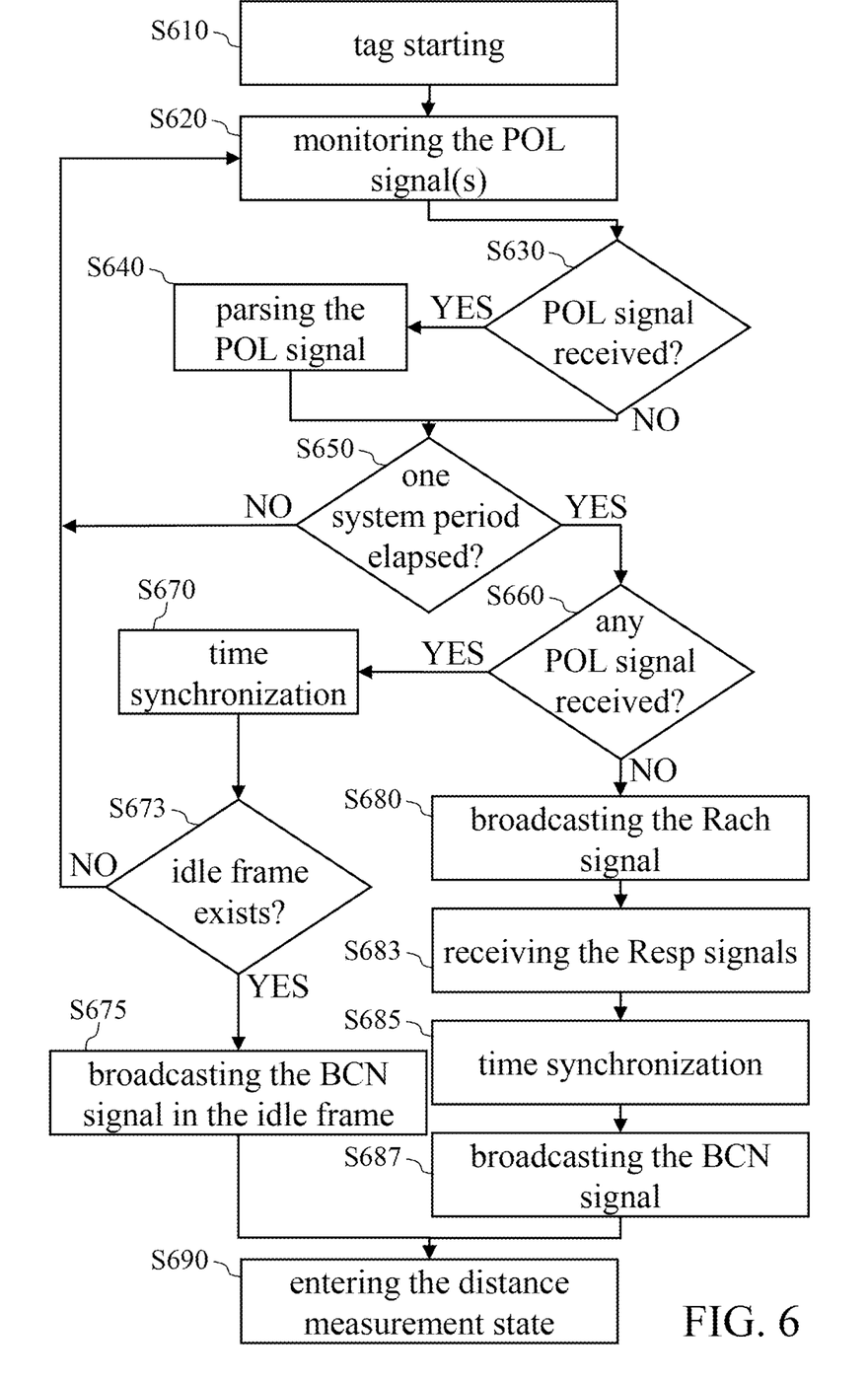
FIG. 6 is an illustrative flowchart of the operation of a tag from starting to entering the distance measurement state.

FIG. 6 shows an illustrative flowchart of the operation of a tag from starting to entering the distance measurement state. After starting (step S610), the tag 130 monitors the POL signal(s) in the air (step S620). If the tag 130 receives a POL signal, the tag 130 parses the POL signal (step S640). This POL signal may be a POL signal sent by the BSs 120 to other tags in the system 100. In step S640, the tag 130 records the system frame number and subframe number carried by the POL signal, and marks the system frame corresponding to the system frame number as occupied (i.e., not idle). For example, if the POL signal is received in the system frame FN_L, which means that the beacon subframe of the system frame FN_K is already occupied, then the system frame FN_K is marked as occupied. In cases where the step S630 is determined negative or after step S640 is completed, the tag 130 determines whether the process of monitoring the POL signal(s) has continued for one system period T (step S650). If step S650 is determined negative, the tag 130 continues to monitor the POL signal(s) (step S620). If step S650 is determined positive, the tag 130 determines whether any POL signal is received in one system period T (step S660). If the tag 130 has received any POL signal, then the tag 130 synchronizes with the system 100 based on the time information carried by the POL signal (i.e., the current system frame number and subframe number) (step S670). Next, the tag 130 determines whether there is any idle frame in the system 100 (step S673). If there is no idle frame, then the tag 130 continues to monitor the POL signal (step S620). If there is an idle frame, then the tag 130 selects an idle system frame (i.e., the system frame that does not correspond to the system frame number(s) recorded in step S640) to broadcast the BCN signal (step S675) and then enters the distance measurement state (step S690).

If the tag 130 does not receive any POL signal within the system period T (step S660 determined negative), the tag 130 broadcasts the Rach signal at any time point (step S680) and then receives the Resp signals sent by the BSs 120 (step S683). The Resp signal carries the current time information of the system 100 (i.e., the current system frame number and subframe number) so that the tag 130 can be time synchronized (step S685). After the time synchronization, the tag 130 determines the time to broadcast the BCN signal and then broadcasts the BCN signal (step S687). For example, if the system frame number carried by the Resp signal is FN_L, the tag 130 broadcasts the BCN signal in the subframe SFN_1 of the system frame FN_K in the next system period (step S687). In some embodiments, if the tag 130 broadcasts a BCN signal in the beacon subframe SFN_1 of the system frame FN_K, then the BS 120 assigns the system frame FN_K to the tag 130 and marks the system frame FN_K as occupied (i.e., busy). The tag 130 broadcasts a BCN signal of an initialization type in steps S687 and S675 and then enters the distance measurement state (step S690).

Figure 7:
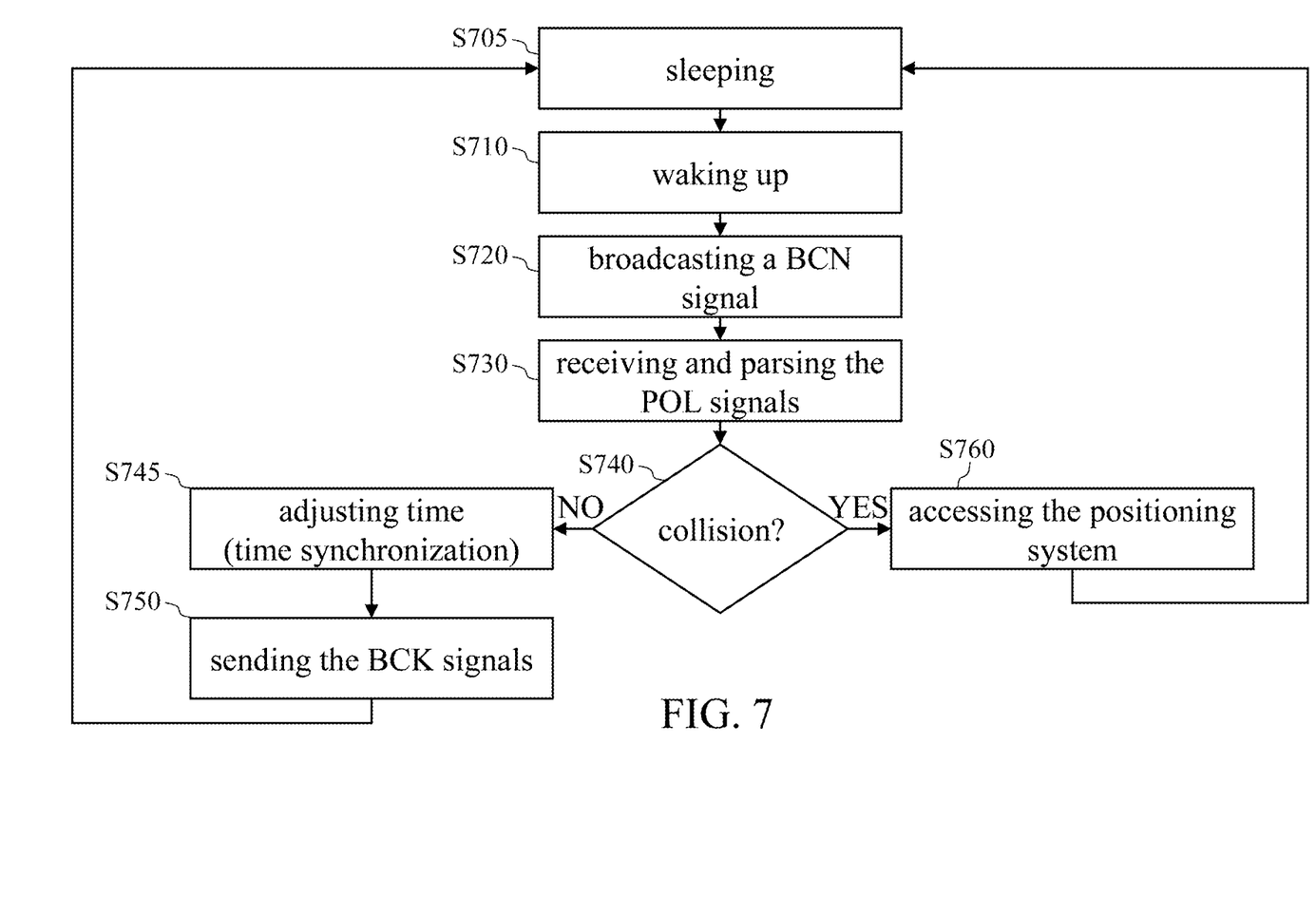
FIG. 7 is an illustrative flowchart of the tag operating in the distance measurement state according to an embodiment of the present invention.

FIG. 7 is a flowchart of the tag operating in the distance measurement state according to an embodiment of the present invention. In the distance measurement state, the tag 130 wakes up from the sleep state (step S710) at least once every system period to broadcast a BCN signal of a normal type in the beacon subframe SFN_1 of the system frame FN_K (step S720), and then waits for x system frames before receiving and parsing the POL signals (step S730) (i.e., receiving and parsing the POL signals in system frame FN_L).

In addition to carrying the tag identification number and the BS identification number of the BS that sent the POL signal, the POL signal also indicates whether there is a collision in the BCN signals. In cases where the POL signal indicates that there is no collision in the BCN signals, or cases where the POL signal indicates that there is a collision in the BCN signals but the tag 130 has confirmed that the tag identification number carried by the POL signal is the same as its own tag identification number (NO branch of step S740), the tag 130 performs step S745 and step S750. In step S745, the tag 130 adjusts its own time based on the BCN signal offset time carried by the POL signal to keep synchronized with the BSs 120. More specifically, because the timing of sending the BCN signal is ideally the beginning of the first subframe (i.e., the beacon subframe) of a system frame, the BS 120 can know whether there is offset in the time of the tag 130 by calculating the time difference between the time when the BS 120 receives the BCN signal and the start time of the beacon subframe, and can thus carries the time adjustment amount in the POL signal. The tag 130 can thus adjust the time accordingly in step S745 (this step can be performed once, multiple times, or skipped in the same system period). In step S750, the tag 130 sends the BCK signals to the BSs that has sent the POL signals. More specifically, the tag 130 sends W-1 BCK signals to the corresponding BSs 120 in step S750. The BCK signal contains the time when the tag 130 received the POL signal and the time when the tag 130 sent the BCK signal. After step S750 is finished or time-out, the tag 130 returns to the sleep state (step S705) to save power.

Steps S730, S740, S745 and S750 are completed in the same subframe of the system frame FN_L. In cases where the POL signal indicates that there is a collision and the tag 130 has confirmed that the tag identification number carried by the POL signal is different from its own tag identification number (YES branch of step S740), the tag 130 needs to access the system 100 again. After accessing the system 100 again (step S760, i.e., steps S620 to S690 of FIG. 6), the tag 130 enters the sleep state (step S705).

In some embodiments, when the tag 130 finds in step S730 that multiple POL signals received in the same system frame correspond to different system frame numbers (which means that the frame assignments of the BSs 120 are disordered, or that the time is significantly out of synchronization between the BSs 120 and the tag 130), the tag 130 broadcasts a BCN signal of a cancel type in the next system period and then accesses the system 100 again.

Figure 8:
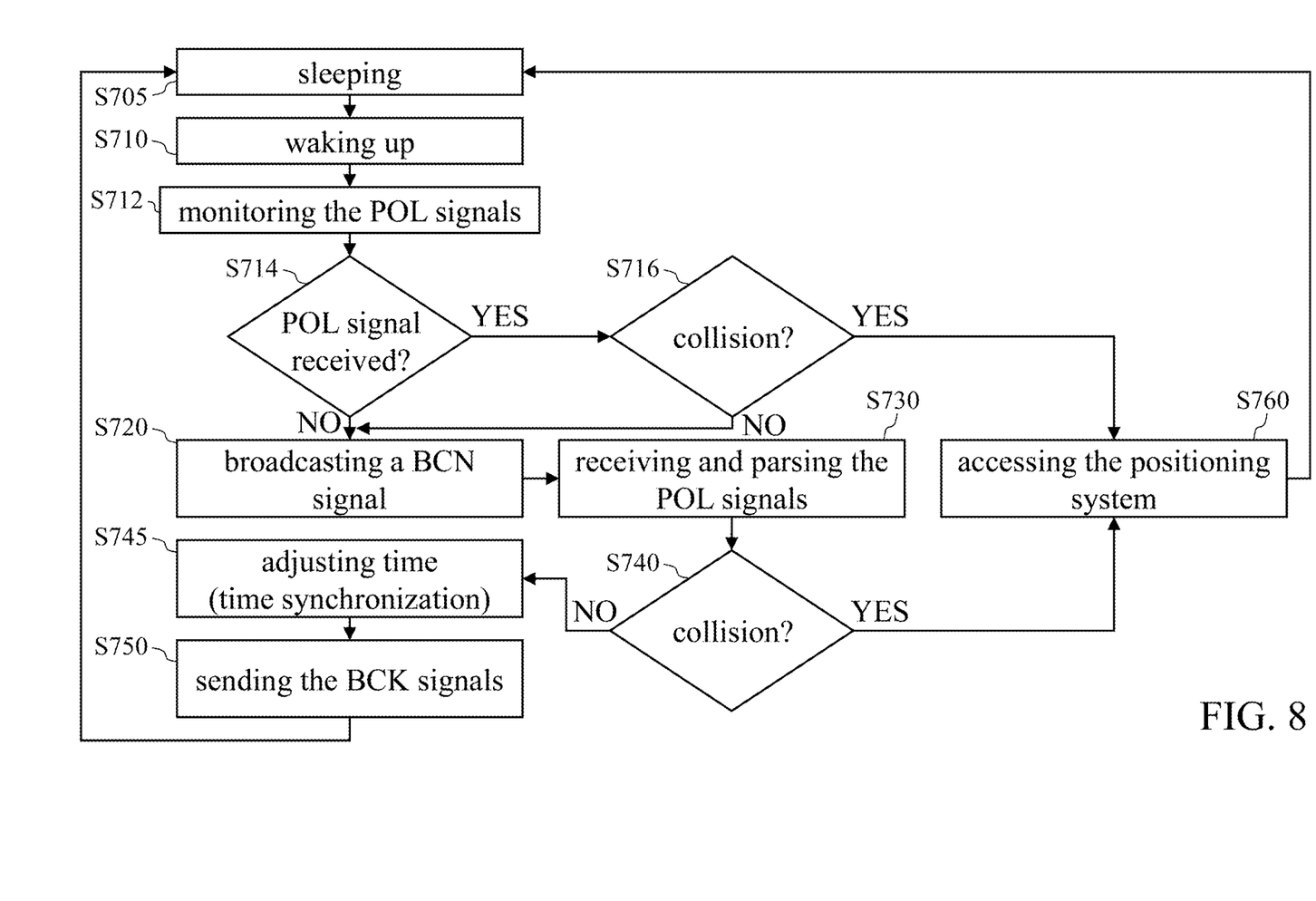
FIG. 8 is an illustrative flowchart of the tag operating in the distance measurement state according to another embodiment of the present invention.

FIG. 8 is a flowchart of the tag operating in the distance measurement state according to another embodiment of the present invention. FIG. 8 differs from FIG. 7 in that in addition to the first tag identification number corresponding to the current system frame (i.e., the tag identification number to which the POL signal is sent), the POL signal carries a second tag identification number corresponding to a future system frame, which is later than the current system frame by y system frames ($1 \leq y \leq Q-1$). Therefore, in this embodiment, the tag 130 leaves the sleep state in an earlier system frame (i.e., y system frames ahead of broadcasting the BCN signal (step S720)) to monitor the POL signals (step S712); that is, the tag 130 monitors the POL signals as early as in the system frame FN_K-y. If the tag 130 does not receive any POL signal (NO branch of step S714), the tag 130 broadcasts the BCN signal after y system frames (i.e., in system frame FN_K) (step S720). If the tag 130 receives a POL signal (YES branch of step S714), the tag 130 determines whether there is any collision (step S716). If the second tag identification number is the same as the tag identification number of the tag 130, there is no collision (NO branch of step S716: the tag 130 performs step S720 to broadcast the BCN signal). If, on the other hand, the second tag identification number is different from the tag identification number of the tag 130, there is a collision (YES branch of step S716: the tag 130 performs step S760 to access the system 100 again).

Compared with the embodiment of FIG. 7, the tag 130 in the embodiment of FIG. 8 can determine in advance whether there will be a collision, so that the collision can be avoided. In some embodiments, the tag 130 sleeps between steps S714 and S720 and/or between steps S716 and S720 to save power. FIGS. 7 and 8 are simplified flowcharts. If there is no collision in the POL signals, the tag 130 is in the wake-up state to receive the POL signals and return the BCK signals in multiple subframes in order before entering the sleep state again.

Figure 9:
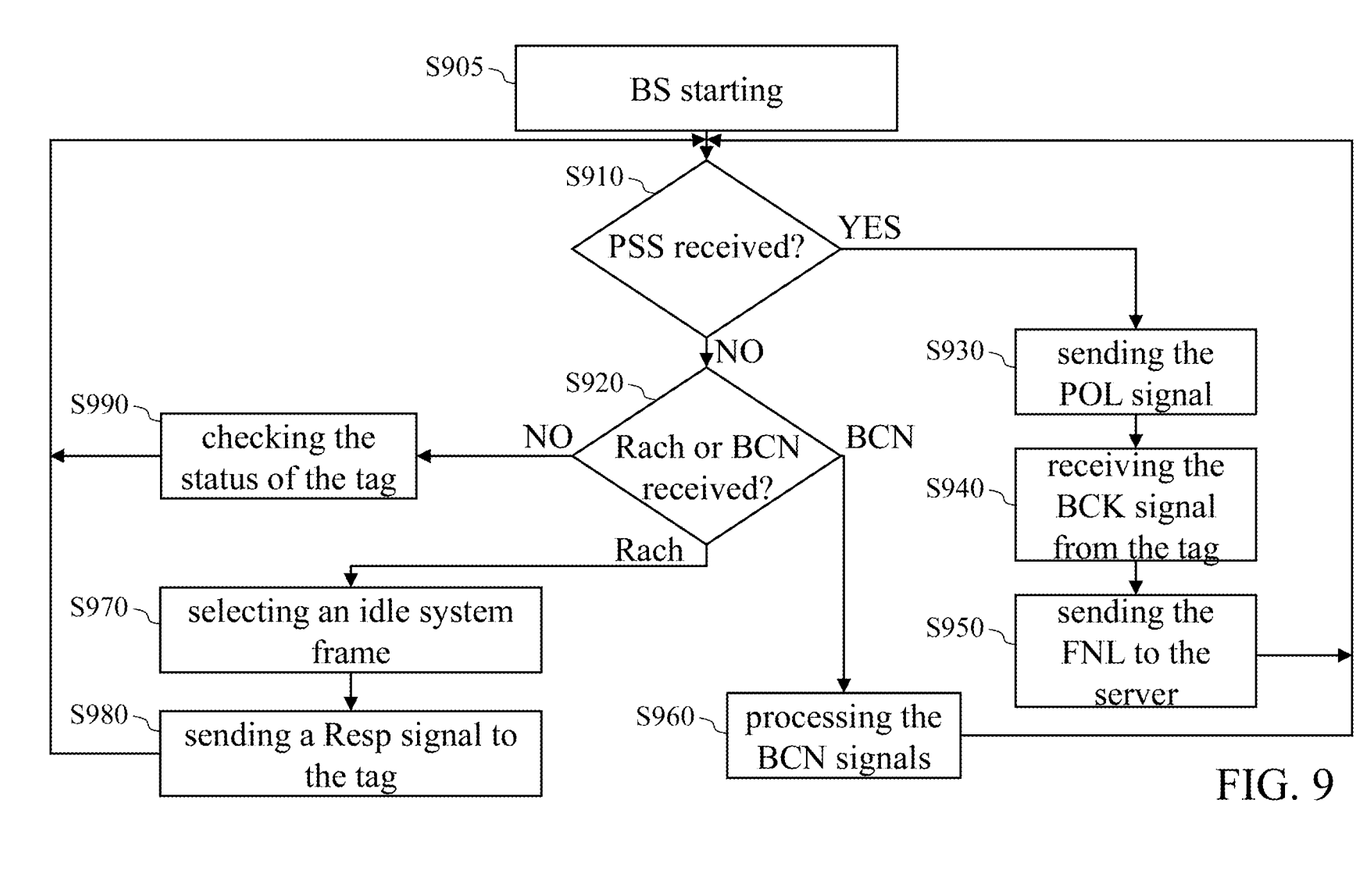
FIG. 9 is an illustrative flowchart of an operation method of a BS according to an embodiment of the present invention.

FIG. 9 is a flowchart of an operation method of a BS according to an embodiment of the present invention. After starting, the BS 120 performs time synchronization so that the frame boundaries of all BSs 120 in the system 100 are aligned (step S905). Next, the BSs 120 enter the receiving state to determines whether the distance measurement command PSS is received (step S910) and whether the Rach signal or the BCN signal is received (step S920). After receiving the distance measurement command PSS, the BS 120 sends the POL signal to the tag 130 in the system frame and subframe specified by the PSS command (step S930), receives the BCK signal from the tag 130 (step S940), then sends the distance measurement result FNL to the server 110 (step S950), and finally returns to step S910.

After receiving the BCN signal, the BS 120 processes the BCN signal (step S960, the details are to be discussed in FIG. 10) before returning to step S910. After receiving the Rach signal, the BS 120 selects, among the system frames starting from the system frame that immediately follows the current system frame, an idle system frame (i.e., the system frame whose beacon subframe is not occupied) (step S970) and sends a Resp signal to the tag in any positioning subframe (i.e., any of subframes SFN_2 to SFN_W) of the selected system frame (step S980). In cases where the BS 120 does not receive the distance measurement command PSS, Rach signal and BCN signal, the BS 120 checks the status of at least one tag in the system 100 (step S990) and returns to step S910 after finishing the check.

In step S990, the BS 120 checks periodically (e.g., at preset time intervals) the accumulated number of the BCN signals that the tag 130 has broadcasted. If any two consecutive checks show the accumulated number does not change, then the BS 120 determines that the tag 130 may have been turned off, dead (low battery), or left the system 100, and so the BS 120 releases the resources occupied by the tag 130 (e.g., the system frame corresponding to the tag identification number of the tag 130). Some steps in FIG. 9, such as steps S970 and S990, can also be executed under the coordination of the server 110.

Figure 10:
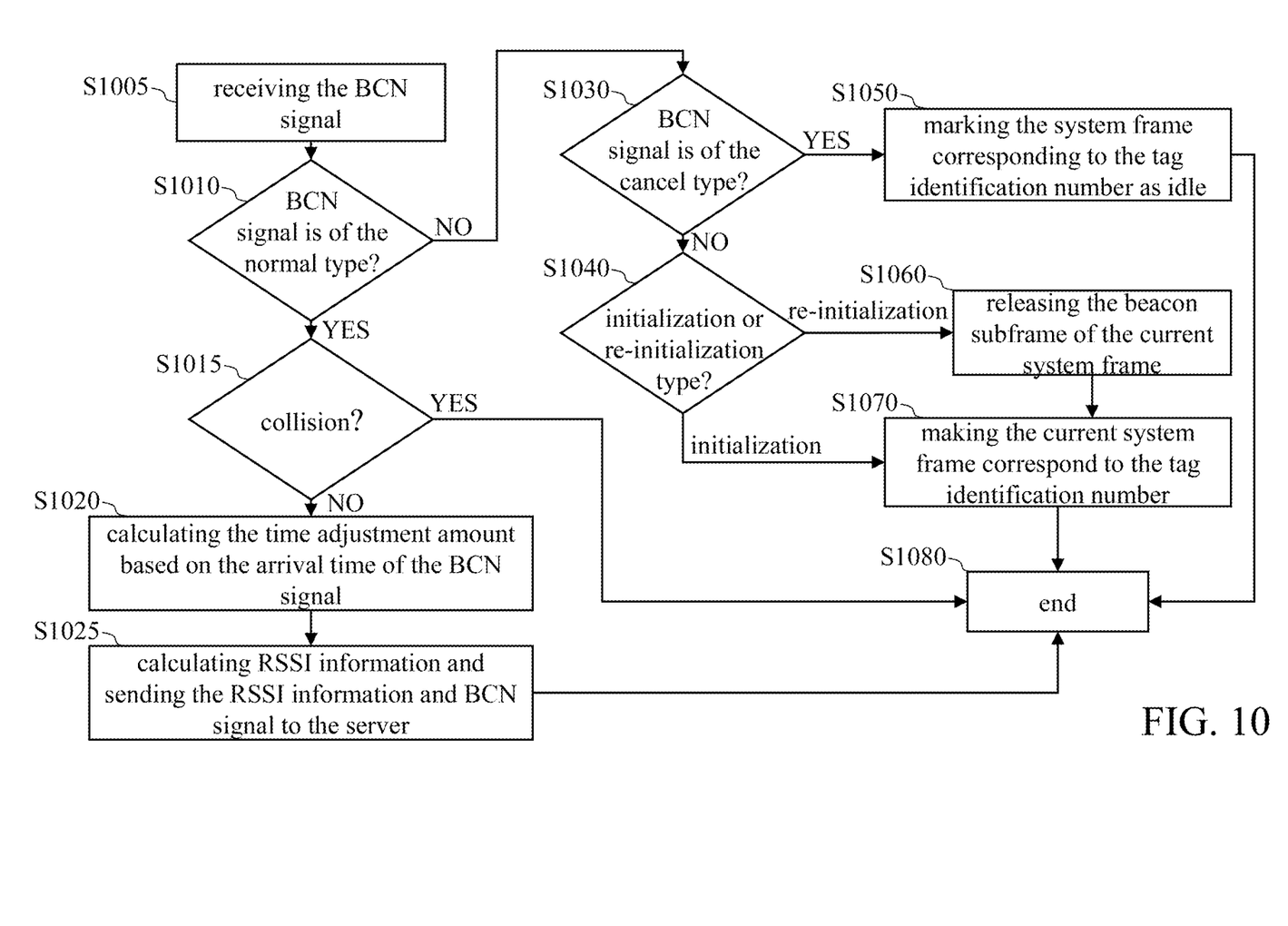
FIG. 10 is an illustrative flowchart of the BS processing the BCN signals (beacon signal) according to an embodiment of the present invention.

FIG. 10 is a flowchart of the BS processing the BCN signals according to an embodiment of the present invention (i.e., the detailed flow of step S960 in FIG. 9). After receiving the BCN signal (step S1005), the BS 120 determines whether the BCN signal is of the normal type (step S1010). In cases where the BCN signal is of the normal type, the BS 120 determines whether there is any collision (step S1015). Because the BS 120 knows whether each system frame is in use and knows the tag identification number corresponding to the system frame in use, the BS 120 can know whether there is any collision based on the tag identification number carried by the BCN signal. If the tag identification number carried by the BCN signal received in the current system frame is different from the tag identification number corresponding to the current system frame, a collision occurs. If a collision occurs, then the BS 120 finishes processing the current BCN signal (step S1080). If there is no collision, the BS 120 calculates the time adjustment amount based on the arrival time of the BCN signal (step S1020). The BS 120 notifies the tag 130 of the time adjustment amount through the POL signal (i.e., step S930 in FIG. 9), such that the tag 130 can adjust the time accordingly to keep synchronized with the BSs 120 (i.e., step S745 in FIGS. 7 and 8). Next, the BS 120 calculates the RSSI information of the BCN signal, inserts the RSSI information into the BCN signal to form the MBCN signal, and then sends the MBCN signal to the server 110 (step S1025).

If the BCN signal is not of the normal type, then the BS 120 further determines whether the BCN signal is of the cancel type, the initialization type, or a re-initialization type (steps S1030 and S1040). In cases where the BCN signal is of the cancel type, the BS 120 marks the system frame corresponding to the tag identification number of the tag 130 as idle, that is, the BS 120 releases the beacon subframe of the system frame previously occupied by the tag 130 (step S1050). In cases where the BCN signal is of the initialization type, the BS 120 marks the beacon subframe of the current system frame as occupied by the tag 130 (step S1070). In cases where the BCN signal is of the re-initialization type, the BS 120 releases the beacon subframe of the current system frame, that is, the BS 120 marks the beacon subframe of the current system frame as idle (step S1060). In some embodiments, step S1060 includes the following sub-steps: the BS 120 first checks whether the tag 130 has previously occupied any system frame, and if so, then the BS 120 releases the beacon subframe of the current system frame as well as the beacon subframe of the system frame previously occupied by the tag 130, for the purpose of ensuring that the system frames and tags are in one-to-one correspondence. After completing step S1060, the BS 120 performs step S1070. After completing step S1050 or S1070, the BS 120 finishes processing the beacon signal (step S1080), and the operation of the BS 120 returns to step S910 in FIG. 9. Some steps in FIG. 10, such as steps S1050 to S1070, can also be performed under the coordination of the server 110.

Please note that there is no step sequence limitation for the method inventions as long as the execution of each step is applicable.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. An operation method applied to an ultra-wideband (UWB) positioning tag which has a tag identification number, comprising:
    broadcasting a beacon signal;
    receiving a polling signal sent by a base station (BS);
    parsing the polling signal which contains a target tag identification number;
    determining whether the tag identification number is the same as the target tag identification number; and
    sending a distance measurement reply signal to the BS after confirming that the tag identification number is the same as the target tag identification number, wherein the distance measurement reply signal contains a first time point when the polling signal is received and a second time point when the distance measurement reply signal is sent.

2. The operation method of claim 1, wherein the UWB positioning tag broadcasts the beacon signal in a first system frame and receives the polling signal in a second system frame, and the second system frame is later than the first system frame.

3. The operation method of claim 1, wherein the UWB positioning tag has accessed an UWB positioning system before broadcasting the beacon signal, the operation method further comprising:
    accessing the UWB positioning system again after confirming that the tag identification number is different from the target tag identification number.

4. The operation method of claim 1, wherein the UWB positioning tag broadcasts the beacon signal in a first system frame, the polling signal is a first polling signal, and the target tag identification number is a first target tag identification number, the operation method further comprising:
    receiving a second polling signal in a second system frame, wherein the second system frame is earlier than the first system frame, and the second polling signal contains a second target tag identification number corresponding to the first system frame;
    determining whether the tag identification number is the same as the second target tag identification number; and
    broadcasting the beacon signal in the first system frame after confirming that the tag identification number is the same as the second target tag identification number.

5. The operation method of claim 1, wherein the UWB positioning tag has accessed an UWB positioning system before broadcasting the beacon signal, the UWB positioning tag broadcasts the beacon signal in a first system frame, the polling signal is a first polling signal, and the target tag identification number is a first target tag identification number, the operation method further comprising:
    receiving a second polling signal in a second system frame, wherein the second system frame is earlier than the first system frame, and the second polling signal contains a second target tag identification number corresponding to the first system frame;
    determining whether the tag identification number is the same as the second target tag identification number; and
    accessing the UWB positioning system again after confirming that the tag identification number is different from the second target tag identification number.

6. The operation method of claim 1, further comprising:
    monitoring the polling signal in a system period;
    broadcasting an access request signal in an attempt to access an UWB positioning system in cases where no polling signal has been received within the system period;
    receiving an access reply signal from the BS after broadcasting the access request signal, wherein the access reply signal contains time information; and
    accessing the UWB positioning system based on the time information.

7. The operation method of claim 1, further comprising:
    monitoring the polling signal of an UWB positioning system in a system period;
    parsing the polling signal to obtain a system frame number and a subframe number carried by the polling signal after receiving the polling signal within the system period;
    synchronizing with the UWB positioning system based on the system frame number and the subframe number; and
    broadcasting the beacon signal in a system frame that does not correspond to the system frame number.

8. An ultra-wideband (UWB) positioning tag which has a tag identification number, comprising:
- a wireless transceiver circuit;
- a memory for storing a plurality of program codes or program instructions; and
- a computing circuit configured to execute the program codes or program instructions to perform following steps:
  - broadcasting a beacon signal;
  - receiving a polling signal sent by a base station (BS);
  - parsing the polling signal which contains a target tag identification number;
  - determining whether the tag identification number is the same as the target tag identification number; and
  - sending a distance measurement reply signal to the BS after confirming that the tag identification number is the same as the target tag identification number, wherein the distance measurement reply signal contains a first time point when the polling signal is received and a second time point when the distance measurement reply signal is sent.

9. The UWB positioning tag of claim 8, wherein the UWB positioning tag broadcasts the beacon signal in a first system frame and receives the polling signal in a second system frame, and the second system frame is later than the first system frame.

10. The UWB positioning tag of claim 8, wherein the UWB positioning tag has accessed an UWB positioning system before broadcasting the beacon signal, the computing circuit further performing following steps:
- accessing the UWB positioning system again after confirming that the tag identification number is different from the target tag identification number.

11. The UWB positioning tag of claim 8, wherein the UWB positioning tag broadcasts the beacon signal in a first system frame, the polling signal is a first polling signal, and the target tag identification number is a first target tag identification number, the computing circuit further performing following steps:
- receiving a second polling signal in a second system frame, wherein the second system frame is earlier than the first system frame, and the second polling signal contains a second target tag identification number corresponding to the first system frame;
- determining whether the tag identification number is the same as the second target tag identification number; and
- broadcasting the beacon signal in the first system frame after confirming that the tag identification number is the same as the second target tag identification number.

12. The UWB positioning tag of claim 8, wherein the UWB positioning tag has accessed an UWB positioning system before broadcasting the beacon signal, the UWB positioning tag broadcasts the beacon signal in a first system frame, the polling signal is a first polling signal, and the target tag identification number is a first target tag identification number, the computing circuit further performing following steps:
- receiving a second polling signal in a second system frame, wherein the second system frame is earlier than the first system frame, and the second polling signal contains a second target tag identification number corresponding to the first system frame;
- determining whether the tag identification number is the same as the second target tag identification number; and
- accessing the UWB positioning system again after confirming that the tag identification number is different from the second target tag identification number.

13. The UWB positioning tag of claim 8, wherein the computing circuit further performing following steps:
- monitoring the polling signal in a system period;
- broadcasting an access request signal in an attempt to access an UWB positioning system in cases where no polling signal has been received within the system period;
- receiving an access reply signal from the BS after broadcasting the access request signal, wherein the access reply signal contains time information; and
- accessing the UWB positioning system based on the time information.

14. The UWB positioning tag of claim 8, the computing circuit further performing following steps:
- monitoring the polling signal of an UWB positioning system in a system period;
- parsing the polling signal to obtain a system frame number and a subframe number carried by the polling signal after receiving the polling signal within the system period;
- synchronizing with the UWB positioning system based on the system frame number and the subframe number; and
- broadcasting the beacon signal in a system frame that does not correspond to the system frame number.

* * * * *